United States Patent
Nardozzi et al.

(10) Patent No.: US 6,636,837 B1
(45) Date of Patent: Oct. 21, 2003

(54) METHOD AND APPARATUS FOR ORDERING PHOTOFINISHING GOODS AND/OR SERVICES

(75) Inventors: Frank M. Nardozzi, Webster, NY (US); Dinesh H. Bhat, College Park, MD (US); Tina M. Clark, Honeoye Falls, NY (US); Lawrence C. Hodge, Brockport, NY (US); Frederic T. Lewis, Fairport, NY (US); Hetal R. Shah, Vienna, VA (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/492,063

(22) Filed: Jan. 27, 2000

(51) Int. Cl.[7] .............................................. G60F 17/60
(52) U.S. Cl. ........................................................ 705/27
(58) Field of Search ............................................ 705/27

(56) References Cited

U.S. PATENT DOCUMENTS

| | | |
|---|---|---|
| 4,574,692 A | 3/1986 | Wahli |
| 4,787,050 A | 11/1988 | Suzuki |
| 4,896,029 A | 1/1990 | Chandler et al. |
| 4,939,354 A | 7/1990 | Priddy et al. |
| 5,032,707 A | 7/1991 | Gudmundson et al. |
| 5,113,351 A | 5/1992 | Bostic |
| 5,153,418 A | 10/1992 | Batterman et al. |
| 5,223,701 A | 6/1993 | Batterman et al. |
| 5,229,585 A | 7/1993 | Lemberger et al. |
| 5,304,786 A | 4/1994 | Pavlidis et al. |
| 5,329,107 A | 7/1994 | Priddy et al. |
| 5,343,031 A | 8/1994 | Yoshida |
| 5,473,151 A | 12/1995 | Priddy et al. |
| 5,504,322 A | 4/1996 | Pavlidis et al. |
| 5,507,527 A | 4/1996 | Tomioka et al. |
| 5,508,783 A | 4/1996 | Iwagaki et al. |
| 5,546,316 A | 8/1996 | Buckley et al. |
| 5,591,956 A | 1/1997 | Longacre, Jr. et al. |
| 5,666,215 A | 9/1997 | Fredlund et al. ............ 358/487 |
| 5,726,435 A | 3/1998 | Hara et al. |
| 5,742,039 A | 4/1998 | Sato et al. |
| 5,742,041 A | 4/1998 | Liu |
| 5,761,558 A | 6/1998 | Patton et al. |
| 5,777,309 A | 7/1998 | Maltsev et al. |
| 5,781,893 A | 7/1998 | Felthauser et al. |
| 5,799,219 A | 8/1998 | Moghadam et al. ........ 396/319 |

(List continued on next page.)

FOREIGN PATENT DOCUMENTS

| | | | |
|---|---|---|---|
| EP | 0 769 720 A1 | 4/1997 | .......... G03D/15/00 |
| FR | 2 787 225 | * 6/2000 | |

OTHER PUBLICATIONS

Stores Without Doors: Kiosks Generate New Profits, by Paul Bandrowski, Corporate Computing, v1, n4, p193, Oct., 1992.*

New Money–Making Opportunities Make Latest Photo Kiosks Sparkle! by Jerry O'Neill, Photo Trade News, v65, n2, p38, Feb., 2001.*

*Primary Examiner*—Kenneth R. Rice
(74) *Attorney, Agent, or Firm*—Frank Pincelli; Susan L. Parulski (57) ABSTRACT

A method, system and apparatus for displaying photofinishing goods and/or services that are being offered for sale. An apparatus is provided which includes a display device for displaying photofinishing goods and/or services that are being offered for sale and a computer for controlling what is displayed on the display device. A computer software program is also provide for programming the computer so that a plurality of the photofinishing goods and/or services will be displayed on the display device and for program monitoring the sales the photofinishing goods. The system allows for the remote reprogramming of the computer for modifying and or re-arranging the position of the photofinishing goods and/or services on the display device.

18 Claims, 9 Drawing Sheets

U.S. PATENT DOCUMENTS

| | | | |
|---|---|---|---|
| 5,808,723 A | * 9/1998 | Klees | 355/40 |
| 5,811,787 A | 9/1998 | Schuessler et al. | |
| 5,831,714 A | 11/1998 | Yoshikawa | |
| 5,886,774 A | 3/1999 | Nishida et al. | |
| 5,907,391 A | 5/1999 | Kobayashi et al. | |
| 5,920,062 A | 7/1999 | Williams | |
| 5,959,285 A | 9/1999 | Schuessler | |
| 5,971,283 A | 10/1999 | Sawaguchi | |
| 5,974,200 A | 10/1999 | Zhou et al. | |
| 6,195,694 B1 | 2/2001 | Chen et al. | |
| 6,233,399 B1 | * 5/2001 | Walter | 396/2 |

* cited by examiner

METHOD AND APPARATUS FOR ORDERING PHOTOFINISHING GOODS AND/OR SERVICES

CROSS REFERENCE TO RELATED APPLICATIONS

U.S. Ser. No. 09/492,062, filed Jan. 27, 2000, entitled "METHOD AND APPARATUS FOR ORDERING PHOTOFINISHING GOODS AND/OR SERVICES";

U.S. Ser. No. 09/492,062, filed Jan. 27, 2000, entitled- "METHOD AND APPARATUS FOR ORDERING PHOTOFINISHING GOODS AND/OR SERVICES".

FIELD OF THE INVENTION

The present invention is directed to providing of photofinishing goods and/or services. In particular, providing an apparatus, method, and system for monitoring, and ordering of photofinishing goods and/or services at a retail establishment to be provided by a remote photofinishing lab.

BACKGROUND OF THE INVENTION

The most common method of placing a photofinishing order is for a consumer to place their exposed film in an envelope marking the appropriate boxes to indicate the products that they desire and dropping the envelope at a retail store. The envelopes are picked up from the retail store and taken to a wholesale photofinisher where the orders are sorted by product or service ordered. This is done manually or by using a machine vision system, reading the checked boxes to determine the product ordered by the consumer. When the envelope contains unprocessed film, additional information about the order is entered at the film splicer. Today photofinishing orders are not limited to processing of photographic film. For example, customers may order reprints, photo CDs, picture disks (computer disks containing customer images), T-shirts with images and mugs having images, and placing images on an internet photo service provider's data base. In addition the images may be provided to the photofinisher for processing in formats other than on film. For example, images may be provided digitally in the form of a computer disk or a memory device used with digital cameras.

A problem associated with the foregoing system is that the customer typically hand-writes the order on the order envelope. In some instances, the writing of the order is illegible which may result in the order being filled improperly or not fulfilled. This of course results in the customer being dissatisfied upon going back to the retailer to pickup the order and finding out that the order was incorrectly filled or could not be fulfilled.

The relative positioning of marketing information of products and/or services relative to other information to a customer is known to affect the purchasing habits of the customer. Generally product and/or service offerings are simply displayed using display devices which are cumbersome to change. This leaves the retailer to verbally advise a customer of recent changes or new offerings. Currently there is no easy or economical way of displaying modified and/or new offering for goods and/or services to a customer.

Another problem with the prior art systems, is that there is no easy way for tracking the likes and dislikes of customers at a particular retail establishment or in a regional location. Further there is little opportunity for a particular retail establishment which has one or multiple retail outlets for customizing or providing promotional services that can vary according to the desires of the retailer, local or regional trends, or in response to the customer.

The general volume of orders arriving at wholesale photofinishers is tracked and known by the hour of the day, day of the week and day of the year. Occasionally, a significant event occurs that changes the normal consumer buying patterns for a wholesale lab. Currently, the lab recognizes that this has occurred when the work arrives at the start of a shift leaving little time to make alternate arrangements to handle an increased workload or off load-another lab. The wholesale photofinishing typically receives orders from hundreds of different retail establishments, often from a chain of similar type establishments. For example, there are drug stores, grocery stores that will have a plurality of different stores which send their photofinishing order to a single photofinishing lab for a local regional area. Sometimes the retail establishment is a national concern having hundreds of different retail establishments which sends the photofinishing orders to more than one central photofinishing lab.

Another problem with the current system is that there is little opportunity to provide up-sales to the customer or advise the customer of additional goods and/or services that may be provided. While some advertisement may be done at the order drop-off center, typically there is no interaction with a retail agent and even if there is, it is not possible for the retail establishment to allow the retail agents to spend very much time with the customer. Thus, there is a need to have the ability to offer additional goods and/or services to the customer with as little disruption to the retail establishment and in a friendly and kind manner to the customer.

Applicants have invented an apparatus, method, and system directed to overcoming the problems of the prior art.

The present invention provides a relatively inexpensive system and method to track and analyze the buying patterns of consumers relative to the number and selection of products offered on a screen; the relative position of the individual products displayed; and the screens presented prior to and subsequent to an individual screen.

The present invention also provides an inexpensive method of modifying offerings of goods and/or services to customers.

SUMMARY OF THE INVENTION

In accordance with one aspect of the present invention there is provided an apparatus for displaying photofinishing goods and/or services that are being offered for sale, comprising:

- a display device for displaying photofinishing goods and/or services that are being offered for sale;
- a computer for controlling what is displayed on the display device;
- a computer software program for programming the computer so that a plurality of the photofinishing goods and/or services will be displayed on the display device, the computer software program monitoring the sales the photofinishing goods and/or services with respect to their position on the display device and re-arranging the position of the photofinishing goods and/or services on the display device based on the monitoring.

In accordance with another aspect of the present invention there is provided an apparatus for displaying photofinishing goods and/or services that are being offered for sale, comprising:

- a display device for displaying photofinishing goods and/or services that are being offered for sale;

a data entry device for entering an order dropped at the apparatus;

a computer for controlling what is being displayed on the display device;

a computer software program for programming the computer for monitor the sales the photofinishing goods and/or services entered into data entry device.

In accordance with yet another aspect of the present invention there is provided a system for displaying photofinishing goods and/or services at a plurality of different kiosks, each kiosk having a display device for displaying photofinishing goods and/or services that are being offered for sale, a data entry device for entering an order dropped at the apparatus, a computer for monitoring what has been entered into the kiosk, comprising;

a central computer in electronic communication with the computer of plurality of the kiosks, the central computer obtaining information regarding order that have been placed at the kiosks.

In accordance with still another aspect of the present invention there is provided a method for controlling a photofinishing product and/or service offering at a remote kiosk, comprising the steps of:

providing an initial product offering with respect to a plurality of goods and/or services on a display screen provided on the kiosk;

the initial product offering being provided in a first presentation sequence;

collection of order information with respect to orders placed at the kiosk; and analyzing the order information and re-sequencing the presentation of the goods and/or services based on the analysis.

In accordance with another aspect of the present invention there is provided an apparatus for displaying photofinishing goods and/or services on a display device;

a computer for controlling what is being displayed on the display device;

a software computer program such that when loaded on the computer will control what is being displayed on the display device;

the software segmenting the display device into a plurality of smaller visual segments in which graphical and/or text information may be provided;

a navigation section for building and/or rebuilding what is being displayed on the display device by controlling what is displayed in each of plurality of smaller segments.

In accordance with still another aspect of the present invention there is provided a system for monitoring and controlling work flow in a photofinishing lab comprising:

a computer for controlling individual devices in a photofinishing lab, the computer being in communication with a plurality of remote collection database systems, each of the collection database systems receives photofinishing orders of items placed in a collection package that are to be processed at the photofinishing lab and includes a data base for keeping track of the order it receives, the computer at a time prior to when the actual collection packages are received communicates with the remote collection database systems so as to obtain a order information of the collection packages that are to be forwarded to the photofinishing lab;

In another aspect of the present invention there is provided a method for monitoring and controlling work flow in a photo finishing lab, comprising:

a central computer located at the photofinishing lab;

a plurality of remote kiosks, each of the kiosks receives photofinishing orders of items placed in a collection container that are to be processed at the photofinishing lab and includes a data base for keeping track of the order it receives, the central computer at a time prior to when the actual collection packages are received communicates with the remote database so as to obtain order information of the orders that are to be forwarded to the photofinishing lab;

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
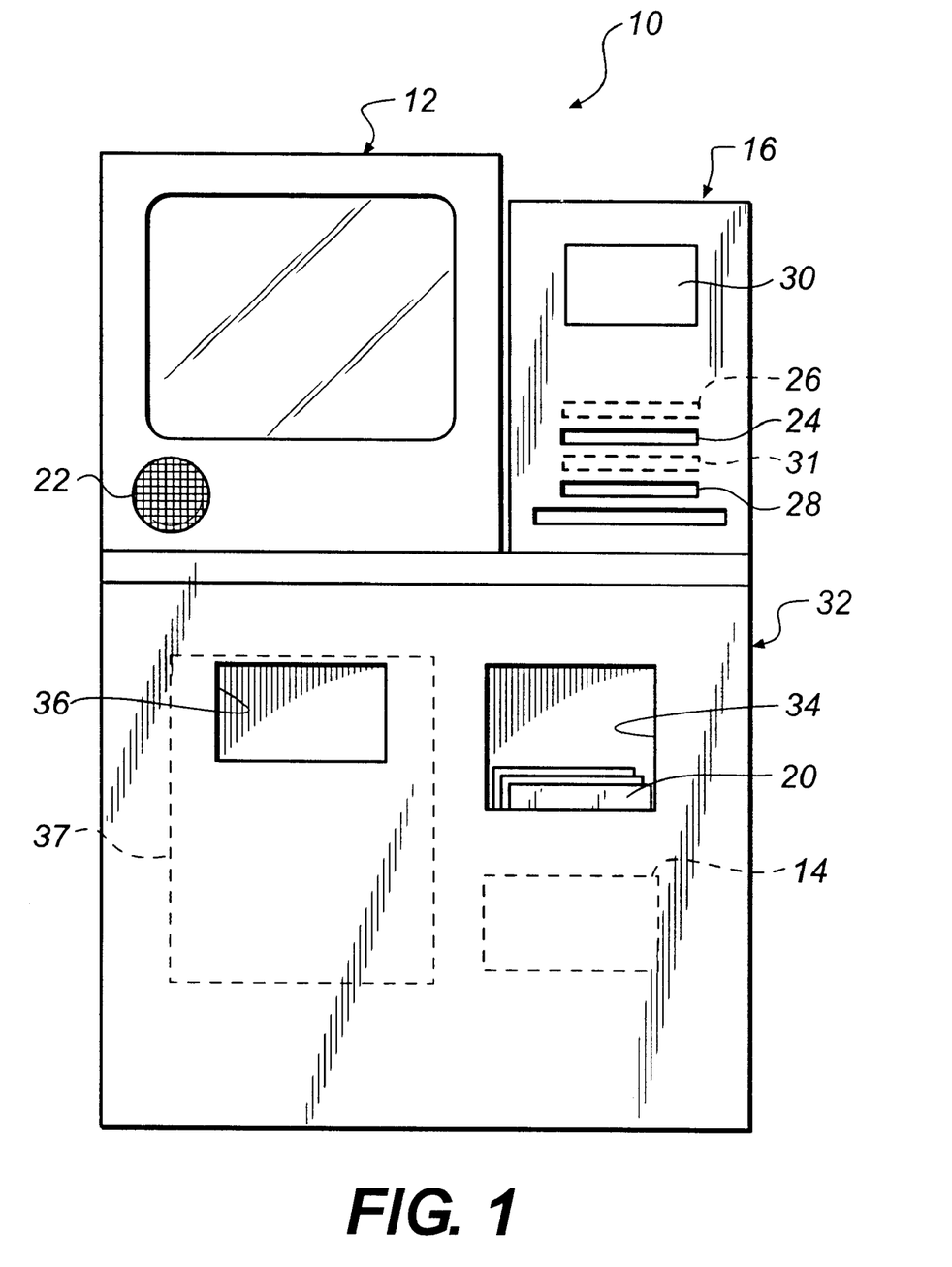
FIG. 1 illustrates an elevational view of an apparatus made in accordance with the present invention.
Figure 4A:
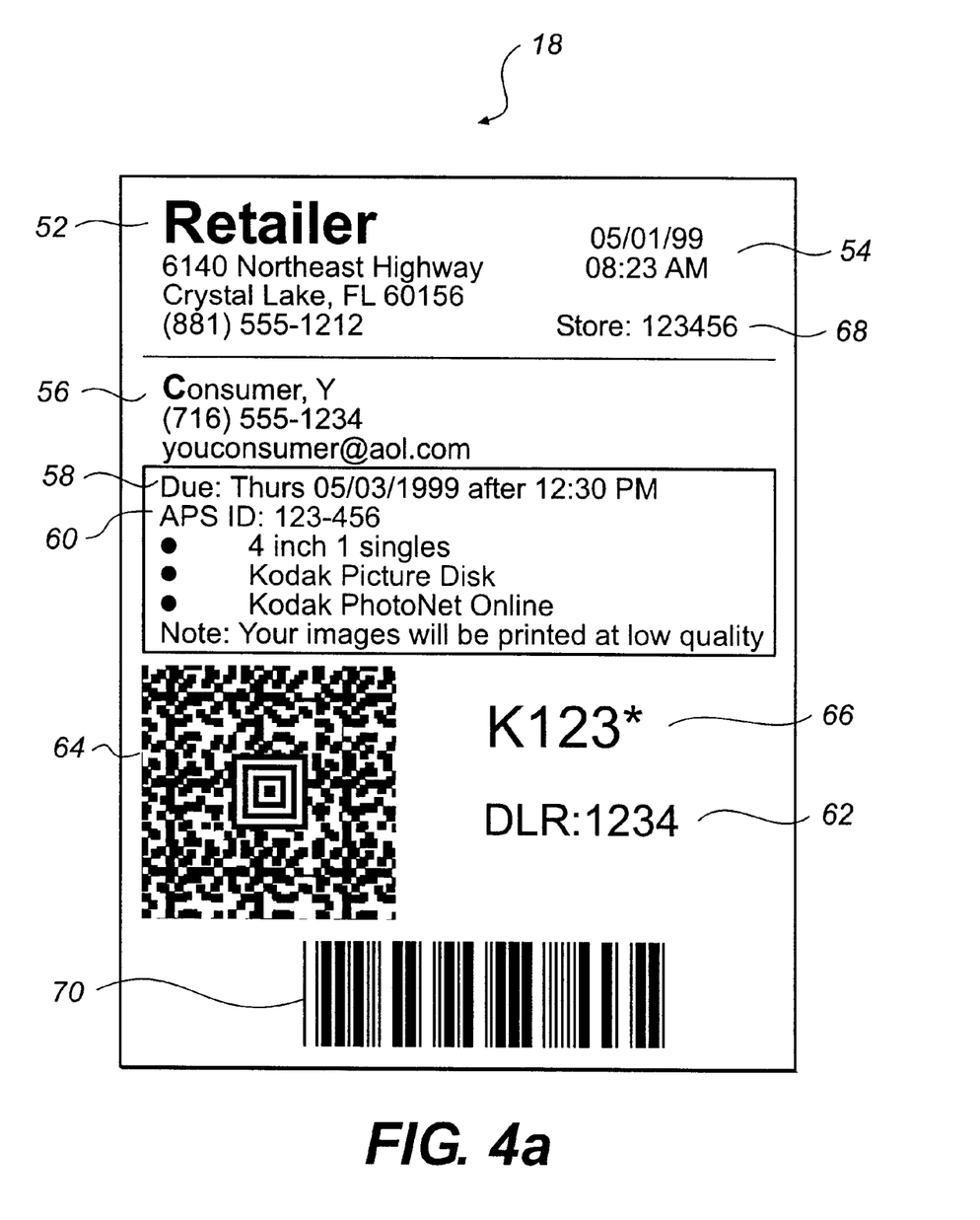
FIG. 4a is an elevational view of a label made by the apparatus of FIG. 1 for use on the package of FIG. 3.

Referring to FIG. 1 there is illustrated an ordering apparatus (kiosk) 10 made in accordance with the present invention. In the particular embodiment illustrated the apparatus 10 is a stand alone kiosk designed for use by a consumer. The apparatus 10 includes a display device 12 for displaying offerings for photofinishing goods and/or services as discussed later herein. The display device 12 also serves as an input device for entering of data into the device by the customer. In particular, the display device is a CRT having a touch screen whereby simply touching of the display screen at the appropriate location information can be entered into the apparatus 10. The customer data entering means may comprise any other appropriate device. For example, but not limited to, a key board or pad, or computer mouse. The apparatus 10 further includes a computer 14 which is appropriately programmed for controlling operation of apparatus 10, the various display screens on display device 12, or any other appropriate operation of apparatus 10 as may be accomplished. The apparatus 10 includes a printer 16 for producing labels and/or receipts such as illustrated by label 18 in FIGS. 4a and 4b. The label 18 of FIG. 4a is designed to be placed on an order envelope 20 in which an image retaining product 22 is provided for the obtainment of photofinishing goods and/or services. A tear off strip 23 is provided on envelope 20 which is kept by the customer as receipt. Strip 23 includes a copy of the order envelope number. In the particular embodiment illustrated the image retaining device 21 is a film cartridge containing a roll of undeveloped exposed photographic film which is being placed in the order envelope for processing for the film and producing of photographic prints. However, the present invention is not so limited. In particular, the image retaining product may be of any type. For example, but not by way of limitation, the items placed within the order envelope 20, may comprise photographic prints, film negatives and digital memory devices which have been used by a digital camera for capturing of images. Additionally, the goods and/or services being ordered may comprise, but are not limited to, the providing of reprints, Photo CDs, Photo Discs, enlargements, clothing apparel such as T-shirts with images or other goods such as mugs having images imprinted thereon, and ordering of services such as placement of the images on an Internet Service Provider database for further manipulation or use by the customer.

Referring back to FIG. 1, the apparatus 10 also includes a speaker 22 which is appropriately controlled by computer 14 for providing of audio sound. This may take the form of providing of voice communication or other sound communication appropriate as may be programmed into apparatus 10. The apparatus 10 further includes an opening 24 in which a credit card may be inserted for being read by a credit card reader 26 disposed within the apparatus 10. The reader 26 may read magnetic bar code or any other appropriate code provided on the credit card.

The apparatus 10 may further include a second opening 28 designed to read a barcode. This may be used to read a loyalty card, barcodes printed on envelopes or a barcode encoded on a film canister. When used to receive a loyalty card (not shown) for a retail establishment, the card will identify the customer such that the computer may readily access either internally or through appropriate electronic communication information regarding the customer. An appropriate card reader 31 is disposed in apparatus 10 for reading of information recorded on the loyalty card in the same manner as reader 26 does for credit cards. For example, but not by way of limitation, the name and address of the customer. Additionally the retail establishment may already have on file, either in computer 14 or in another computer that is accessible by computer 14, information regarding the customer preferences and/or purchase order history etc. This information may be used in determining what display screens are displayed on display device 12.

The apparatus 10 includes a communication connection 30 for connecting to a memory card or other memory device for downloading of the digital files containing digital information regarding captured images to apparatus 10. For example, a memory card from a digital camera or by the images being downloaded to the computer 14 whereby the customer may later provide appropriate instructions with regard to the images downloaded to the apparatus 10. This can include, but is not limited to, the displaying of the downloaded images whereby the customer may further manipulate the images prior to the ordering of goods and/or services.

The apparatus 10 is supported by a support stand 32 which may or may not be an integral part of apparatus 10. In the embodiment illustrated, stand 32 is a separate support structure. An opening 34 is provided in stand 32 for holding a plurality of order envelopes 20 for use by customers with apparatus 10 for ordering of photofinishing goods and/or services. The support stand 32 further includes an opening 36 which empties into a receiving container 37. Completed order envelopes 20 are deposited by the customer into container 37 through opening 36 that are later picked up and forwarded to a photofinishing lab 38 for fulfilling of the order.

Figure 2:
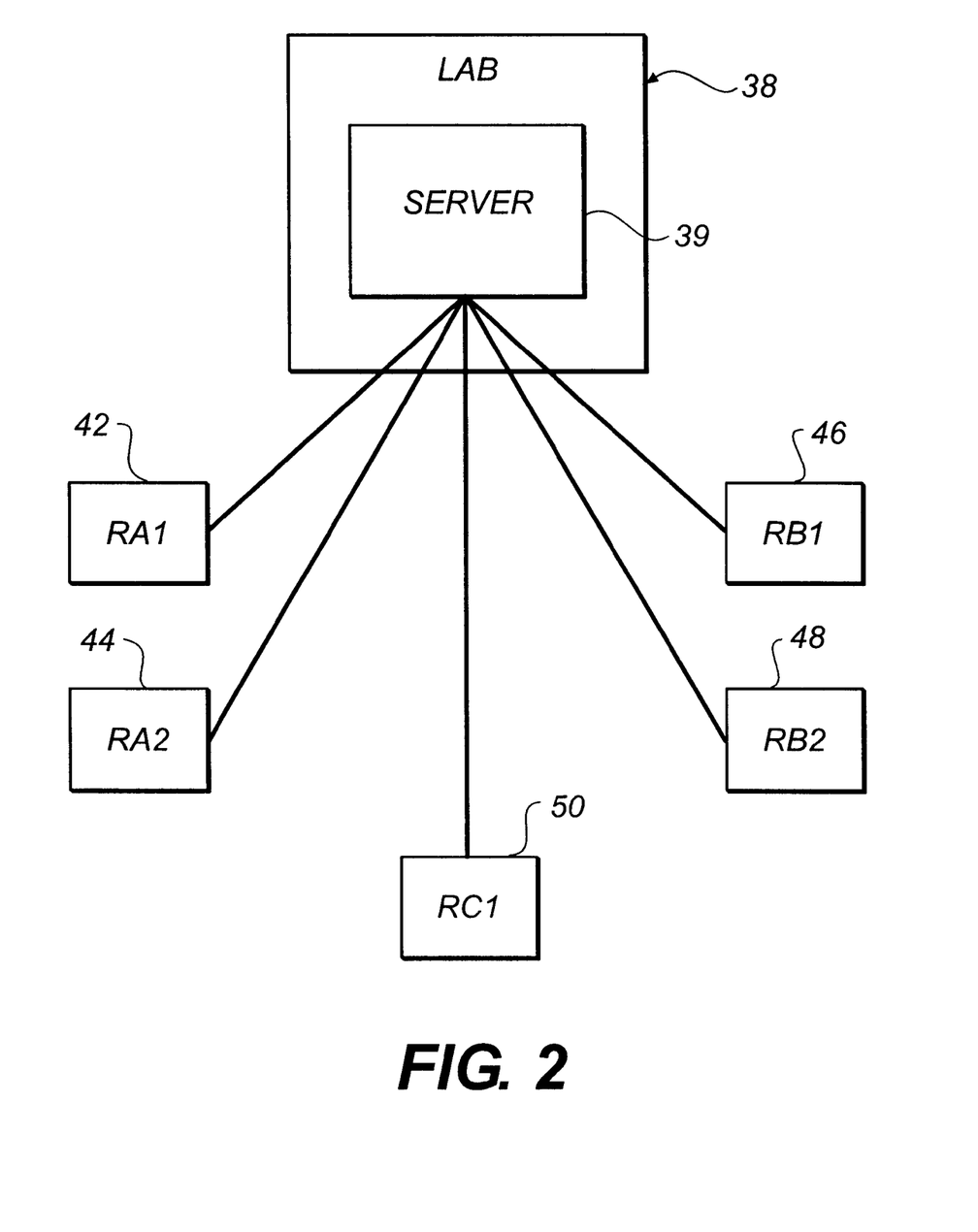
FIG. 2 is a schematic illustration of a system for ordering and fulfilling customer orders at a central photofinishing lab, with respect to orders received from a plurality of retail establishments.
Figure 3:
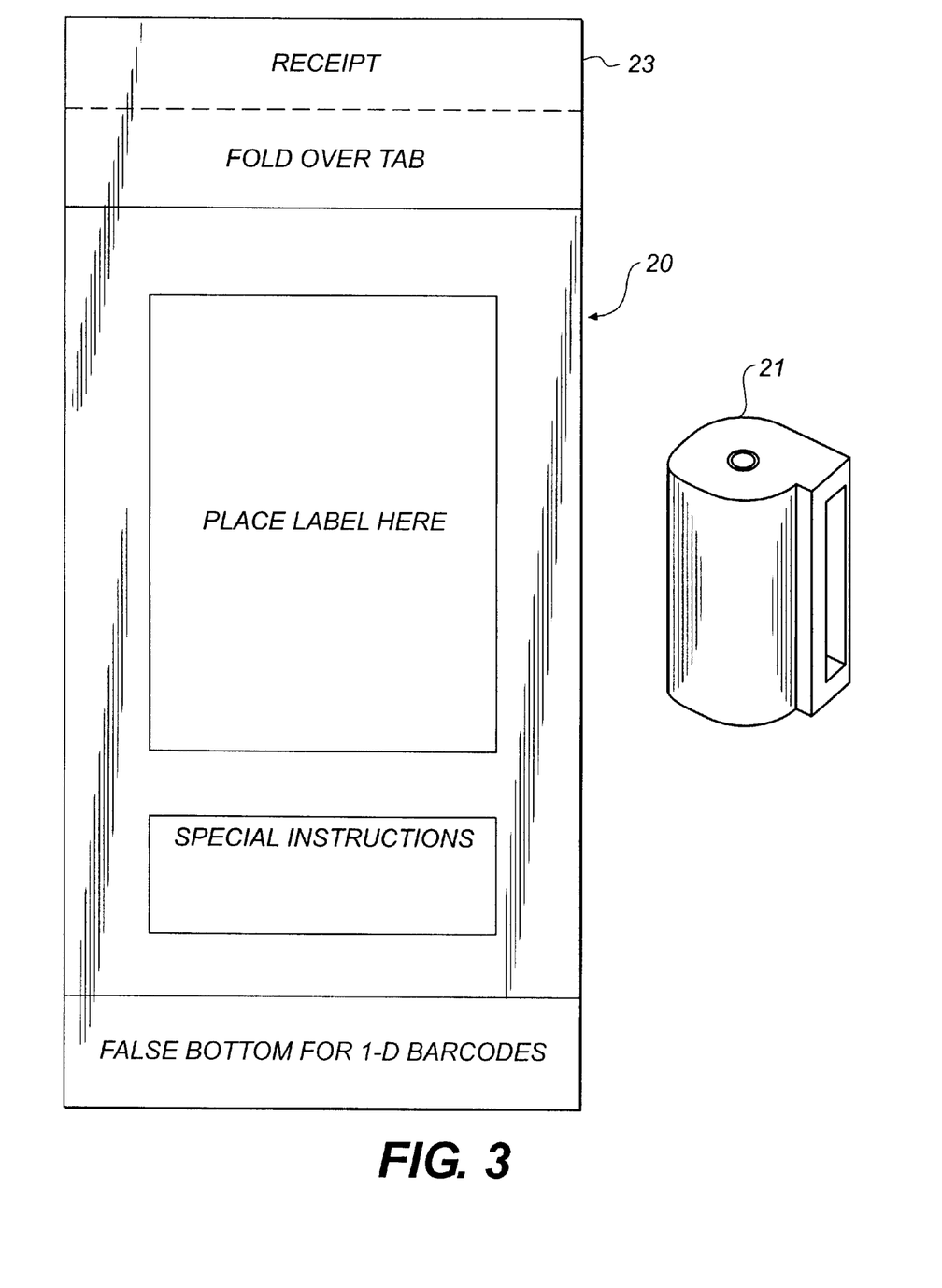
FIG. 3 is an elevational view of an order envelope and image retaining device for use in the apparatus of FIG. 1 and system of FIG. 2.

Referring to FIG. 2 there is illustrated photofinishing lab 38 that will ultimately receive the orders deposited in container 37. The photofinishing lab 38 is set up to process film and produce prints as is customarily done at such labs. The completed order is typically packaged and then returned to the retail establishment from where it was received to be picked-up by the customer. The photofinishing lab 38 may also provide a variety of other goods and/or services for example, but not by way of limitation, providing of digital images on other types of formats such as CDs or computer disks, provide copies or enlargements of an existing prints, provide images on clothing and other articles (for example, T-shirts and mugs), or digitally scan images on the developed film and place them on an Internet Service Provider's database which can be accessed by the customer over the internet.

As illustrated by FIG. 2, the photofinishing lab 38 includes a computer 39 which is in electronic communication to a plurality of different kiosks 10 located at a variety of remote locations. For example, but not by way of limitation, computer 39 may be connected to computer 14 of the various kiosks 10 via the internet. In the particular embodiment illustrated, the photofinishing lab 38 is illustrated as being connected to five different kiosks 10 identified by numerals 42, 44, 46, 48 and 50. It is of course to be understood that the photofinishing lab 38 may be connected to a multitude of such devices. In a particular photofinishing lab 38, there may be for example, several hundred kiosks 10 provided at a variety of different retail establishments. For example, the kiosks 42 and 44 may be located at two different locations for a common retailer such as a chain of drugstores having a retail establishment at location RA1 and at RA2. These locations may be in the same city, state or region of the country. In the particular embodiment illustrated a pair of kiosks 46 and 48 are provided at a second retail establishment having two different locations represented by RB1 and RB2. A fifth apparatus 50 is provided at yet another retail establishment RC1. It is of course to be understood that any desired number of retailers, kiosks and locations may be provided. FIG. 2 has only illustrated connection to five (5) different kiosks 10 for the purpose of clarity of describing the present invention.

Figure 5A:
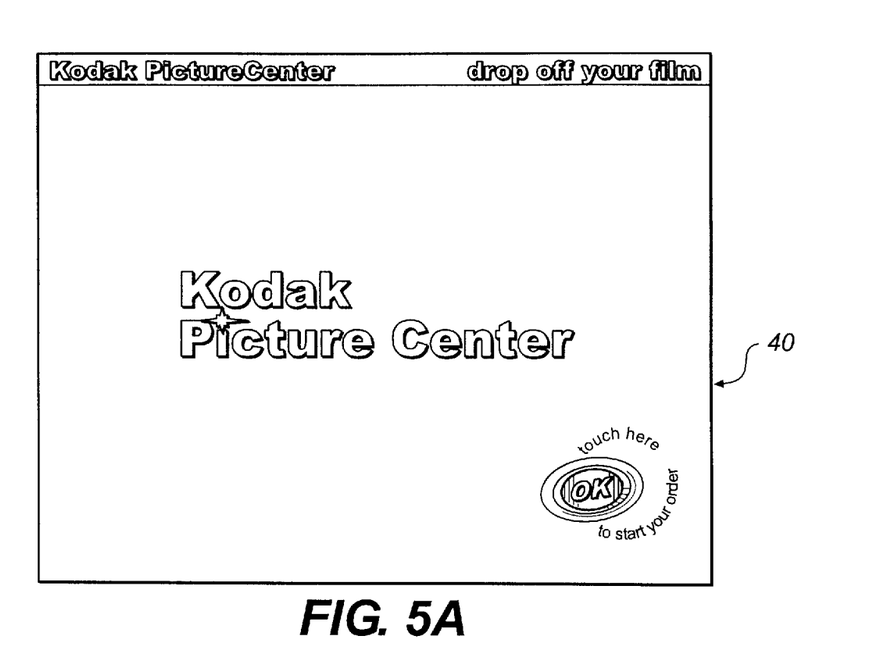
FIG. 5a is an elevational view of a screen display of the display device of the apparatus of FIG. 1 used by the customer when initially approaching the device of FIG. 1.
Figure 5B:
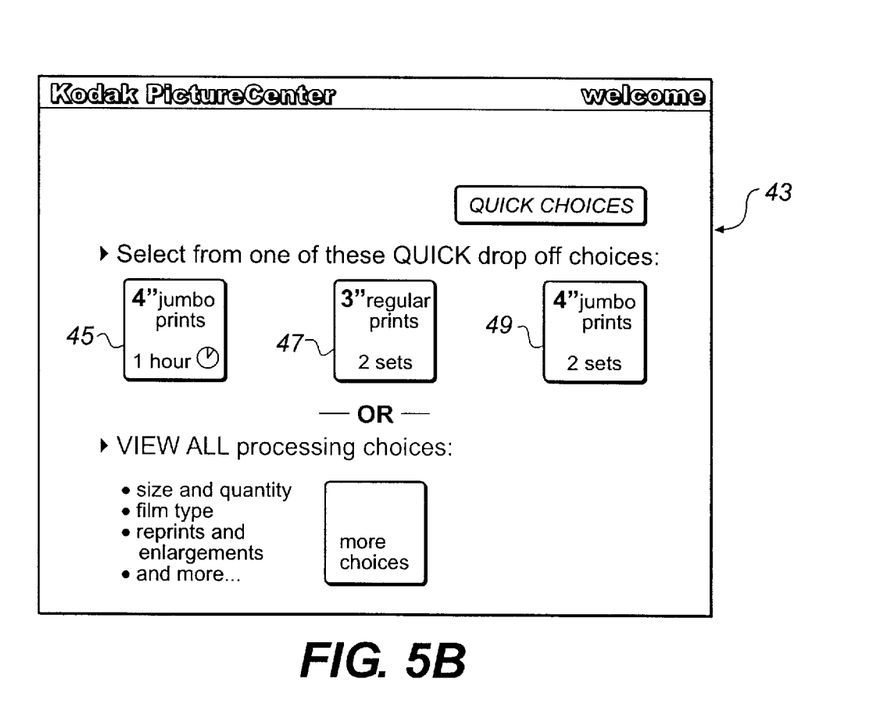
FIG. 5b is an elevational view of another display screen on the display device of the apparatus of FIG. 1 illustrating a first product offering screen that may be displayed to the customer.

Referring to FIG. 5a there is illustrated an initial display screen 40 illustrated on display device 12 of a single apparatus 10 located at a retail establishment. Typically, the initial display screen 40 is designed to entice the interest of a customer and provide some information regarding the goods and/or services being offered. If the customer has a customer loyalty card or has used a credit card with the apparatus 10, an instruction would be provided for the customer to insert the loyalty or credit card in the appropriate opening 24 or 28. Upon the entry of a loyalty card or credit card, appropriate information can be read from the respective cards and used by the apparatus, or used to look up information in the memory of computer 14 or a remote computer at the retail establishment, lab 38 or other computer which maintain relevant information regarding the customer. The customer information may have also been either pre-programmed by the customer at an earlier time or by the retailer if so desired. Thus, the use of the card in apparatus 10 will automatically provide customer information and minimize or avoid the customer from entering personal information. This also allows for the automatic customizing of the screen for that customer, based on the past buying history or personal information of the customer as discussed later herein. Once a customer engages the apparatus 10, a second data display screen 43 (as shown by FIG. 5b) is illustrated. As illustrated by display screen 43, a customer is given the option of some quick choices 45, 47 and 49 or the option of going through all of the additional selections. If either of the selections 45, 47 and 49 are selected, the order will immediately be identified and the customer will no longer need to do any further work. After which a label 18 such as illustrated in FIG. 4a will be produced with the appropriate information including sufficient information to identify the user and the order selected. This information will be written both in human readable form and machine readable form.

Referring in particular to FIG. 4a, the label 18 includes various indicia 52–70 for providing a multitude of information that will be used by the photofinisher 38. Indicia 52 identifies the retailer and the location of the apparatus 10. Indicia 54 identifies the time when the order was placed. Indicia 56 identifies the consumer for example, the name, postal address and E-mail address. Indicia 58 identifies the due date when the requested goods and/or services will be provided. Indicia 60 identifies the particular type of film being processed. For example, as illustrated, indicia 60 identifies the illustrated order as an APS roll of photographic film and additionally provides the cartridge ID. Indicia 62 identifies the photofinishing lab which the order is to be sent for completion. Indicia 64 is a two dimensional code which can contain all of the information relating to the customer order. Indicia 66 represents the product sort code that is being ordered. This helps the photofinishing lab in fulfilling of the order. Indicia 68 provides the retail store number, which is the number given to the retail establishment which the apparatus 10 is located. Indicia 70 is a sort bar code which would be used by the photofinishing lab for separating different types orders based on the service being requested. It is of course understood that any desired information may be printed on label.

The use of a two-dimensional code represented by indicia 64 in the present invention, provides a low cost alternative to manual or machine vision sorting. Using the kiosk, the consumer is presented with the products offered through the wholesale photofinisher. As the consumer places an order at the kiosk, the kiosk records the purchases including the name of the consumer; the name, location and identifier of the retail store; the products ordered; the date of purchase; and other relevant information. At completion of an order, the kiosk prints label 18 which includes indicia 64, a two-dimensional (referred to as Aztec) bar-code. This two-dimensional bar-code contains the information necessary for the wholesale photofinisher to complete the consumer's order. The advantage of the bar-code is that it is relatively easy to retrieve the order information with low cost equipment replacing the hand sorting and expensive machine vision systems. The indicia 64 includes a self aligning feature which makes it easy to be able to read the complex information printed thereon.

The large amount of information stored in a two-dimensional bar-code allows the information to be stored in what is referred to as a delimited format. This uses commas or other special characters to separate fields within the bar-code. Parameters are defined by the field that they are located in i.e. 1, 2, . . . n. New parameters can be added over time by defining additional fields (adding delimiters). Since older (different) systems use parameters from specific fields, the format is compatible across a variety of devices that write the bar-code and a variety of devices that read the bar-code.

As previously discussed, once the label 18 is provided by the apparatus 10 it is placed on an order envelope 20, typically by the customer. One of the order envelopes 20 placed in opening 34 may be used for this purpose. The order envelope 20 is then filled with the appropriate item to be processed, for example, a photographic film cartridge. The label 18 is preferably provided with an adhesive layer on the back side of the label 18. Use of the two dimensional code avoids the necessity of precisely placing the label on the envelope 20. The envelope 20 is sealed and then placed into opening 28 and then drops into container 37. At some point in time the completed order envelopes 20 in container 37 are gathered and forwarded on to the photofinishing lab 38 for fulfilling of the orders.

The present invention preferably prints the order information on a separate label so as to avoid the use of an expensive printer for printing on the envelope 20. However, the information printed on the label may be printed on the envelope 20 if so desired. In which case appropriate information is written on the tear off strip 23.

Figure 4B:
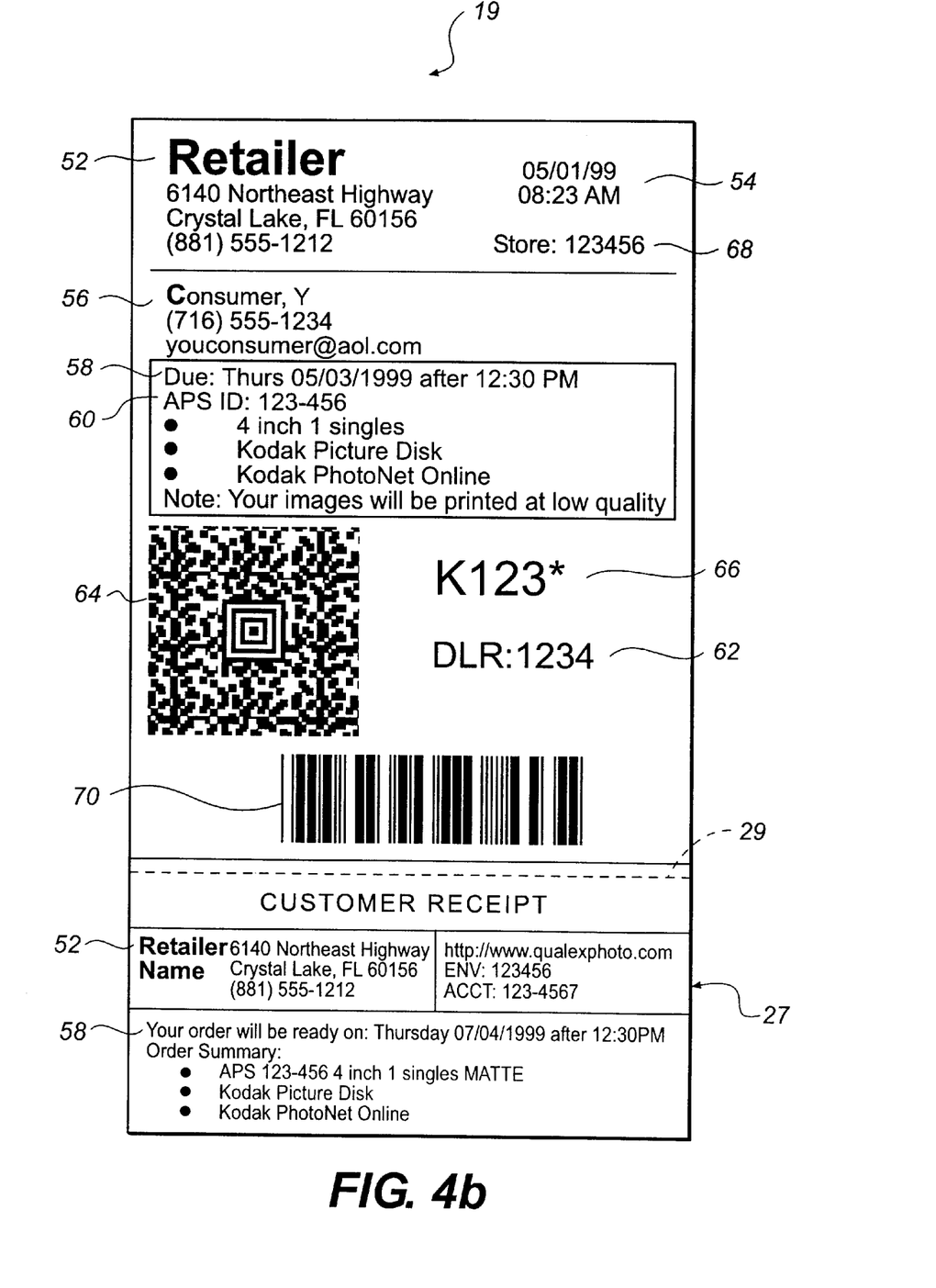
FIG. 4b is an elevational view of a combination label and receipt made by the apparatus of FIG. 1 and system of FIG. 2.

FIG. 4b illustrates a modified combination label and receipt 19 that can be printed by printer 16. Combination label and receipt 19 comprises a label section 25 and a receipt section 27. A separation line 29 is provided between section 25 and section 27. In the embodiment illustrated separation line 25 comprises a line of perforation which allows section 25 to be easily separated from section 27 by the customer. Section 25 is substantially identical to label 18 and is used in the same manner. Whereas section 27 is a receipt to be kept by the customer. Section 27 would contain all pertinent information regarding the order placed by the customer. Section 25 would comprise the label 18 to be placed on the order envelope 20. Only section 25 would be provided with adhesive on the back side so that it can be secured to envelope 20. The receipt section 27 may be shaped so as to conform to fit on the tear off strip 23 of envelope 20. The printing device may be configured to allow for a self pealing of the label/receipt as it travels through the printer.

Figure 5C:
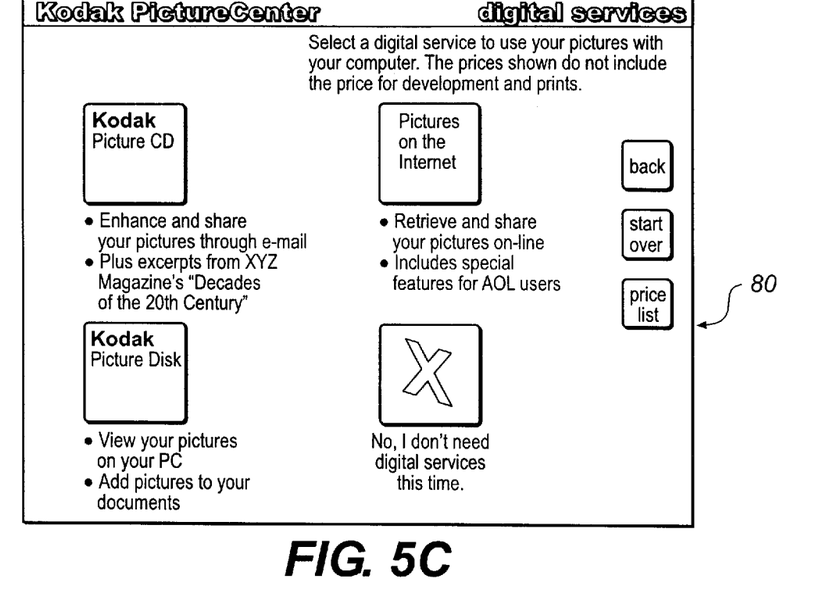
FIG. 5c is a view similar to FIG. 5b illustrating a second different display screen used to offer additional goods and/or services to the customer.

Referring to FIG. 5c there is illustrated display screen 80 wherein additional good or services can be provided. For example, as illustrated by screen 80, the following offerings are provided: Picture Disk (images provided on a computer disk); Picture CD (images provided on a computer CD); the availability of receiving images on the internet. By the appropriate selection of the desired services and order label may be generated or additional selection screens are displayed by display device 12.

Figure 5D:
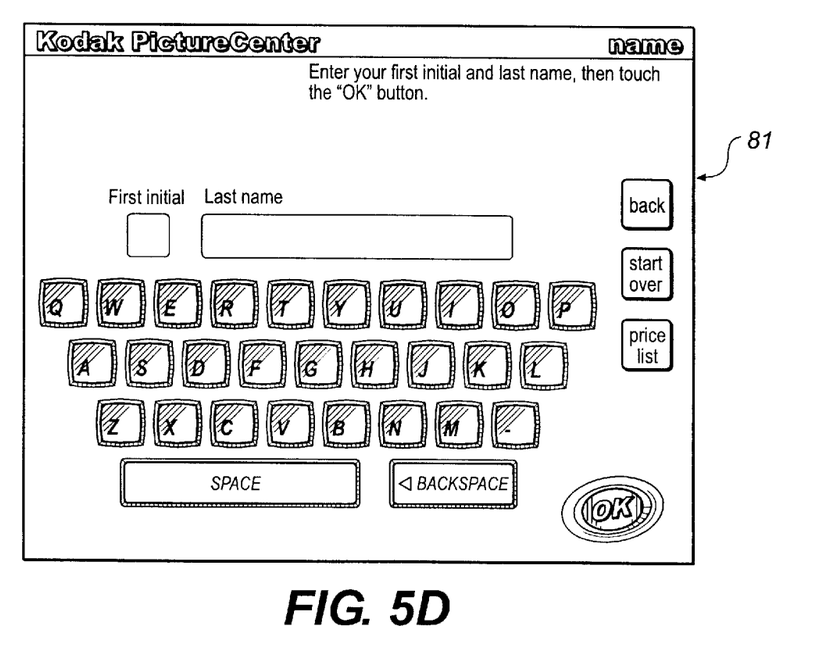
FIG. 5d is a view similar to FIG. 5b illustrating a display screen where the customer provides any required information for placing of a photofinishing order.
Figure 5E:
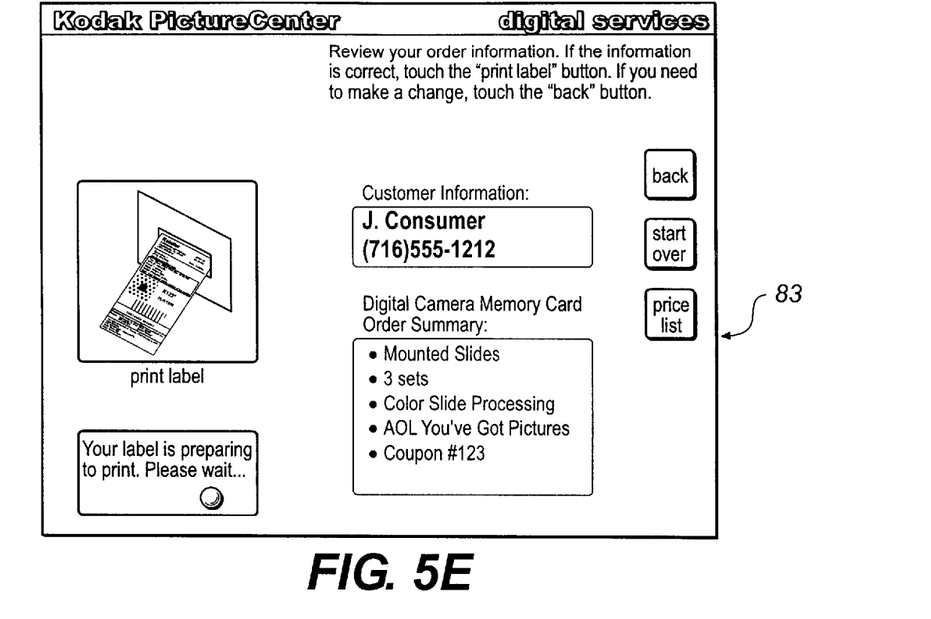
FIG. 5e is a view similar to FIG. 5b illustrating a final confirmation screen of the customer's order that has been placed.

A customer data entry screen 81 is then displayed as shown by FIG. 5d after the customer selections have been completed. If no loyalty or credit was initially used the customer will now be prompted to enter the appropriate customer data as required. Screen 81 may be passed if the credit card and/or loyalty card used by customer allows access to the appropriate information. A final confirmation screen 83 as illustrated in FIG. 5e is displayed on completion of the order process by the customer. Upon approval of confirmation screen, label 18 is printed by printer 16 for placement on an order envelope 20.

If digital goods and/or services are desired, the appropriate selection is made in one of the earlier screens whereby additional screens would be displayed on display device 12 to the customer for selection. For example, if more choices were selected on screen 43 shown by FIG. 5b the screens on FIG. 5c could be illustrated for ordering picture CDs, picture disks, pictures provided on the internet. Appropriate other indicia could be provided for navigating the customer through the various screen options. The customer may select to start over or simply say that they don't need digital services.

Figure 5F:
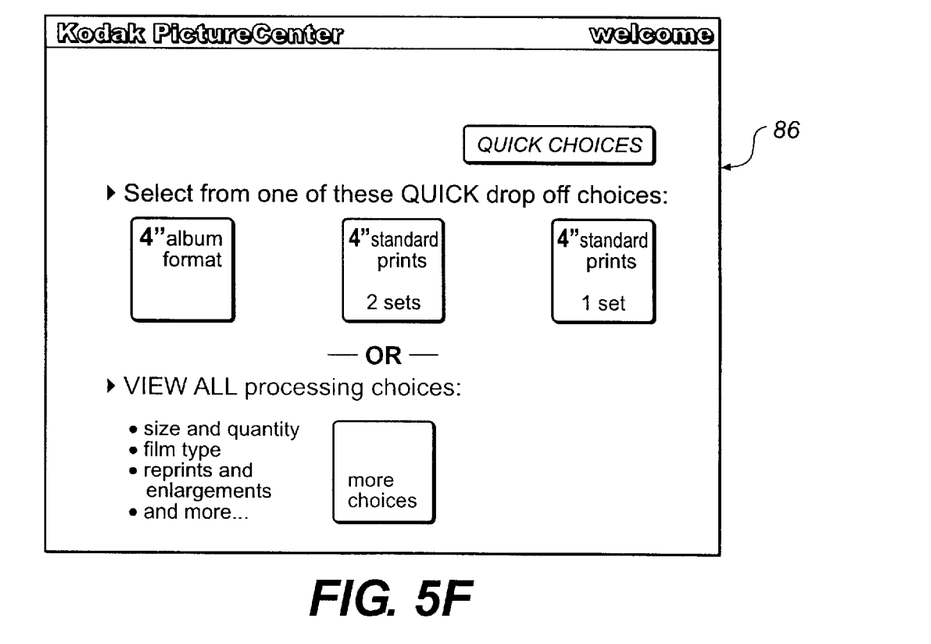
FIG. 5f is a view similar to FIG. 5b illustrating an up-sell of at least one item.

A feature of the present invention is that if a customer has previously used the device 10 or one of the other devices in contact with computer 39, information regarding previous orders of that customer can be retrieved and analyzed either locally or at a remote computer so as to customize the display screen specifically for that particular customer. For example, if in past situations the customer has only obtained photoprocessing for a particular type of film such as APS or 35 mm film, screens can be made especially for that customer and narrowing the selection to the relevant selections for that customer. In addition, new product offerings relating to previously selected goods or services which the consumer may have not thought of ordering may be displayed. Referring to FIG. 5f there is illustrated a screen 86 to be displayed on device 12 which is similar to screen 78 of FIG. 5b, except that there is illustrated a special offering that is either being promoted by the retail establishment and/or the photofinishing lab which will ultimately fulfill the order. In the particular embodiment illustrated, indicia 88 on screen 86 illustrates that the order may be selected in an album format whereby the images are placed together on an 8×10 leaf having images on both sides. A discount coupon (not show) can be advertised along with the product offering. The screen 86 may also illustrate an example of the product. It is to be understood that various other type goods and/or services may be promoted as desired. For example, a particular retailer could have a particular promotion provided on a weekly basis or some other periodic time frame or specials may be tailored to particular habits of that particular customer. In particular, if the customer does not typically order digital goods and/or services, a promotional display could be provided to encourage the customer to try these new digital type goods and/or services. It is to be understood that any desired promotion may be provided and selected as required.

The initial designs of kiosks to determine the arrangement of user interface screens may include business research studies in test markets. However, this is an expensive time consuming process that provides insight to a limited number of aspects of the kiosk design.

The present invention also allows the ability to monitor the buying patterns of goods and/or services for a particular type customer, retail establishment in a given locality or region. For example, a nationwide retailer that offers goods and/or services throughout the nation may find that a particular region or area of the country prefers a particular type of goods and/or services. In which case these particular retail establishments could offer those particular goods and/or services to that particular region as opposed to offering these similar goods and/or services in areas that have other likes.

Figure 5G:
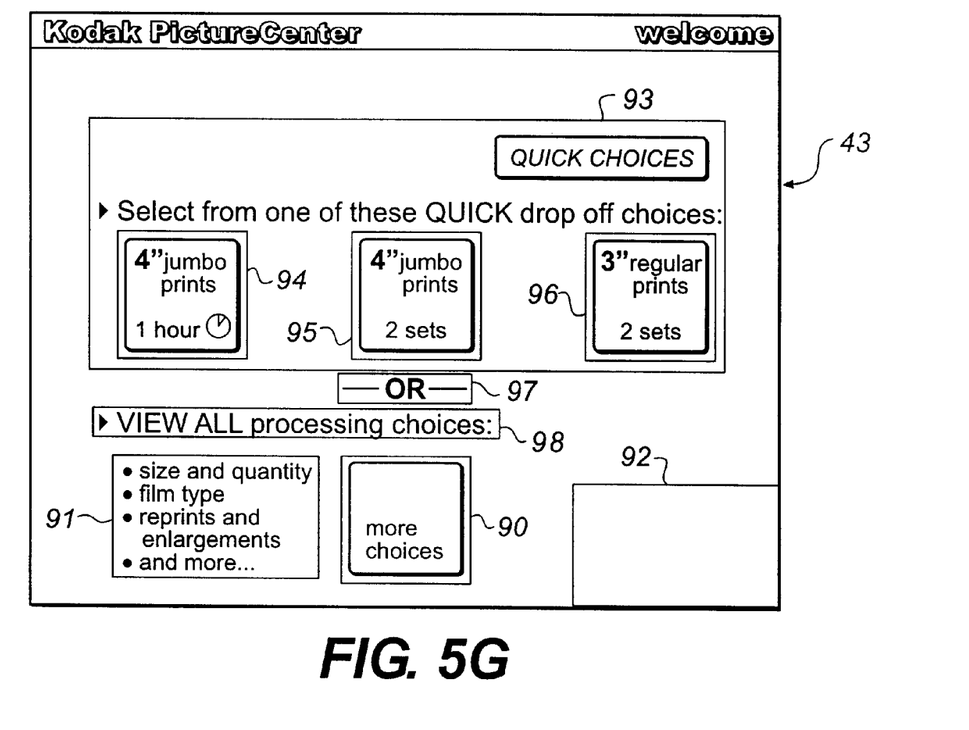
FIG. 5g is a view similar to FIG. 5b illustrating how the screen display is divided into different visual segments.

Another problem is the cost and time associated with modifying the user interface screens as more effective presentations are developed. Referring to FIG. 5g there is illustrated visual segments (illustrated by the box lines)used in the production of screen 78 of FIG. 5b. As can be seen, the screen 89 of FIG. 5g has nine visual segments. Segments 90, 91, 92, 93, 94, 95 96, 97 and 98. Any one of the segments 90, 91, 92, 93 94, 95, 96, 97 and 98 may be changed independent of the other segments. Segment 93 includes three smaller segments. Thus when updating or modifying screens for particular customers, retail establishments, either locally or regionally, only the visual segments of screens that require modification are changed. In the particular embodiment illustrated, the apparatus 10 is provided with memory directories. One directory which maintains the screens that are currently being used and at least one other directory for screens that may be replaced or used at some later time based on a predetermined criteria. For example, upon a given date new promotional screens may be provided and updated. A third directory would maintain all of the image segments which are used to construct the various display screens. This third directory can be used to provide new visual sections as required or desired by the retailer or photofinishing lab.

The foregoing allows easy re-positioning of the various offerings on the various display screens. As previously mentioned, the particular location of an offering can have an affect on the purchasing habits of customer. The present invention allows easy repositioning of the offerings and by tracking and analyzing the sales of the various offerings, it can be determined the best positioning for any particular offering. Since all of the ordering information is being gathered by computer 39 of the photofinishing lab 38 from the numerous connected kiosks 10, the lab 38 is in the best position to analyze the purchasing habits of particular customers, at particular retail establishments, and local and regional trends, the photofinishing lab 38 is in the best position to analyze the data. The lab 38 can then send appropriate software programming down to the individual computers 14 of the various kiosks 10 to reprogram the respective computers to modify the display screens to improve selling of goods and/or services at each kiosk 10 which is tailored for each respective kiosk.

The present invention, as previously discussed, provides a method to record every consumer order as it is placed through the kiosk 10. By transmitting the order information to computer 39 at the photofinishing lab 38 either periodically or when a criteria is met, the lab 38 can have several hours of advanced warning of a change in demand to prepare for the change in workload. As previously discussed, the photofinishing lab 38 is in communication with the apparatus 10. The photofinishing lab 38 includes a computer 100 which periodically communicates with the various apparatus 10 at the various retail establishments which they are located. For example, during the day at various times, mid-morning, noon and late afternoon, the computer 39 at the photofinishing lab can poll all of the computers 14 to determine what orders have been placed that day. Thus, it can then know what orders will be arriving to the photofinishing lab before they actually arrive. Additionally, most preferably, at the time of pick-up of the orders from each of the apparatus 10 at the various locations, the apparatus 10 would automatically identify that the orders have been picked up and provide all of the information immediately through the communication link to the photofinishing lab 38 such that the service provider will know in advance what orders are on their way to being processed. Quite often the time period can be several hours or more before the orders are actually received by the photofinishing lab. Thus, at an early time period the photofinishing lab 38 will know exact type and amount of work that is being forwarded. This allows the lab 38 to make adjustments in personnel and/or equipment at the photofinishing lab 38 to adjust for the workload for a given night. This will help make the photofinishing lab 38 much more efficient.

The consumer's purchase of a product or services requires that they respond to several screens on apparatus 10. The offer of alternate products is dispersed between these screens to inform and entice the consumer to purchase these products. The ability to remotely refresh the kiosk provides the capability to test new marketing messages and products, quickly developing an understanding of their effectiveness and tuning the presentation.

The computer 39 also maintains a record of what is being sold at the various retail establishments. Thus, consumer purchases and trends can be monitored in detail. In addition, should the retailer wish to have particular special runs at one or more of its' stores, this promotional can be automatically set into the various apparatus 10 at the various locations and tailored to a specific store or chain of stores. This can be done in advance prior to the actual start of promotion. For example, if a promotion is to start on a Monday of a given week, the promotional information can be forward from the computer 39 to the computer 14 and placed in a second storage directory, such that upon reaching of a particular date, the special promotional will be automatically employed into the various screens displayed to the customer. This can be programmed into computer 39 which in turn can be sent to kiosk 10 via electronic communication for programming of the computer 14. This also allows the photofinishing lab 38 to provide its own special promotional as appropriate. Additionally, the segmenting of the screens into different visual segments allows reorientation of the particular offerings. Applicants have found that the particular position of certain product offerings can have an influence on the up-sell of a particular goods and/or services. Thus, periodically, various screens can be automatically re-oriented such that the product and good offerings are placed at different locations on the display screen of display device 12. This is easily employed by the fact that various visual segments have already been provided for the screen. Thus, only the appropriate segments needed to be changed or moved around without disturbing the rest of the screen. Furthermore, since the visual segments are broken down into smaller segments than the entire display screen, this can be done in a much more efficient and easy manner than providing to the apparatus. FIG. 5g illustrates a re-arrangement of the offerings of screen 40 of FIG. 5b. This is particularly important when certain goods and/or services are being promoted to the customer. Quite often these special promotions are called up-sells which are trying to interest the customer in the ordering of additional goods and/or services which are an up-scale sell of the current goods and/or services being ordered. The computer 14 by it self or at the direction of computer 39 can be periodically re-arrange the position of the offerings. By monitoring and analyzing the sales record of the offerings at the various locations, the offerings can be positioned for each kiosk 10 for the best sales for those goods and/or services.

It is known that remote kiosks may be programmed. Software products such as Tivoli and PCAnywhere are used to remotely refresh computers. The problem with remote refreshing of a kiosk is the expense of transmitting the computer program to a kiosk. The refreshing of a kiosk may require 10 or more hours to accomplish using a high speed modem.

The current invention provides a software architecture that allows the kiosk to be refreshed using a small subset of the kiosk software. The software is segmented into a navigation file, screen sub-images and software applets. The application software is divided into a large number of Java and C++ applets that perform individual finctions. The screens are likewise divided into a large number of small visual segments. The navigation file links the small visual segments and the applets together to create the user interface and navigate the consumer through a variety of sequences. Other software within the kiosk is likewise divided into small functions for the convenience of refreshing the kiosk. When the same small images for visual segments can be used in multiple places in the kiosk software, the efficiency of refresh is improved. The kiosk is refreshed with only the few relevant files that need to be transmitted to the kiosk. This has resulted in refreshing a 365 megabyte kiosk application with 2.5 megabytes of information.

It is desired to use the same software application in kiosks for a large number of retailers with different product offerings, promotions, trademarks, etc. The ability to refresh the kiosks with a limited amount of information during the process of installing the kiosk improves the manufacturing and reliability of the kiosk.

Using a modem as a low cost method of refreshing a kiosk is problematic due to the availability of the kiosk at the time a refresh is desired. The kiosk is occasionally busy taking a consumer order, powered off or disconnected from the telephone service.

The current invention addresses this problem by pre-staging a refresh at the kiosk prior to the desired date (date/time). The kiosk application is constructed with a redundant file structure. The simplest form of the structure is a "current" and "next" directory path. In this form, the kiosk operates using files stored in the "current" directory. Prior to the date when a refresh is desired, the files to be refreshed are downloaded to the "next" directory. The desired date or other criteria are also transmitted to the kiosk. At the first convenient time after the desired date or other criteria is met, the kiosk copies the files from the "next" directory to the "current" directory.

This invention may take several forms. Replicate directories or a list of files to be refreshed have advantages for different types of software within the kiosk. Image files can be updated with most methods. C++ objects and .dlls that require registration within a library or system registry are easier to manage using file lists.

Installing a remotely managed kiosk is often problematic due to the information required during the installation. The installer usually needs to know a number of parameters to complete an installation. At some universities, this results in a document containing dozens of pages. The problem is providing only the necessary information to the installer at the time of installation. The preferred form of the present invention provides a method to reduce the information required by the installer and reduce the likelihood of an incorrect installation. The installation process takes advantage of the fact that this is a photofinishing kiosk. As part of the traditional photofinishing business, the consumer places an order into a photofinishing envelope and expects that the ordered products are returned to them in the same store. This is done by printing a dealer number (or identifier) on the envelope to be used by the out bound sorters of the photofinisher. Since these envelopes are available near the kiosk, the installer is asked to enter the dealer number, the telephone number of the modem (or IP address) and the local access number to make outbound telephone calls. The kiosk then connects to the server using an 800 number or other standard telephone number. The kiosk uses the dealer number to determine the dealer configuration information from a database. The telephone number of the modem is used to determine the least expensive telephone number for future connections. The server transmits the configuration information to the kiosk. The kiosk presents the name of the retail store and address to the installer for confirmation. After confirmation, the connection between the kiosk and the server is terminated. The kiosk then connects to the server using the configuration information to have the dealer specific software downloaded to the kiosk.

It is to be understood that various modifications and changes may be provided as desired. For example, the particular goods and/or services being offered may be modified as desired by the retail establishment and/or photofinishing lab. Additionally, the apparatus is not limited to the particular manner as set forth and may be a single integrated kiosk or broken down into individual separate components wherein the label printer is a separate individual device from that of the display screen and computer.

It is to be understood that various other changes and modifications may be made without departing from the scope of the invention. The present invention being limited by the following claims.

| PARTS LIST |
| --- |
| 10. apparatus |
| 12. display device |
| 14. computer |
| 16. printer |
| 18. label |
| 19. receipt |
| 20. order envelope |
| 21. image retaining device |
| 22. speaker |
| 23. tear off strip |
| 24. opening |
| 25. label section |
| 26. credit card reader |
| 27. receipt section |
| 28. second opening |
| 29. separation line |
| 30. communication connection |
| 31. card reader |
| 32. support stand |
| 34. opening |
| 36. opening |
| 37. receiving container |
| 38. photofinishing lab |
| 39. computer |
| 40. display screen |
| 42. kiosks |
| 43. display screen |
| 44. kiosks |
| 45. choices/selections |
| 46. kiosks |
| 47. choices/selections |
| 47. choices/selections |
| 48. kiosks |
| 47. choices/selections |
| 48. kiosks |
| 49. choices/selections |
| 50. apparatus |
| 52. indicia |
| 54. indicia |
| 56. indicia |
| 57. indicia |
| 58. indicia |
| 60. indicia |
| 64. indicia |

| -continued |
| --- |
| PARTS LIST |
| 66. indicia |
| 68. indicia |
| 70. indicia |
| 74. indicia |
| 78. screen |
| 80. display screen |
| 81. data entry screen |
| 83. confirmation screen |
| 84. screen |
| 86. screen |
| 88. indicia |
| 89. screen |
| 90. segment |
| 91. segment |
| 92. segment |
| 93. segment |
| 94. segment |
| 95. segment |
| 96. segment |
| 97. segment |
| 98. segment |
| 100. computer |

What is claimed is:

1. An apparatus for displaying photofinishing goods or services that are being offered for sale, comprising:
   a display device for displaying photofinishing goods or services that are being offered for sale;
   a computer for controlling what is displayed on said display device;
   a computer software program for programming said computer so that a plurality of said photofinishing goods or services will be displayed on said display device, said computer software program monitoring the sales of said photofinishing goods or services only at the apparatus with respect to their position on said display device and re-arranging the position of said photofinishing goods or services on said display device based on said monitoring.

2. An apparatus according to claim 1 wherein said software program periodically rearranges the position of said photofinishing goods or services on said display device.

3. An apparatus according to claim 1 wherein said software modifies only a portion of goods or services.

4. An apparatus for displaying photofinishing goods or services that are being offered for sale, comprising:
   a display device for displaying photofinishing goods or services that are being offered for sale;
   a data entry device for entering an order dropped at said apparatus;
   a computer for controlling what is being displayed on said display device; and
   a computer software program for programming said computer for monitor the sales said photofinishing goods or services entered into data entry device, said computer software program re-arranging the position of said photofinishing goods or services on said display device based on said monitoring.

5. An apparatus according to claim 4 wherein said date entry device comprises said display device being a touch CRT.

6. An apparatus according to claim 4 wherein said data entry device comprises key pad or key board.

7. An apparatus according to claim 4 wherein said data entry device comprises a computer mouse.

8. An apparatus according to claim 4 wherein said apparatus further comprises a communication means for forwarding data to a remote computer.

9. An apparatus according to claim 8 wherein said computer software is capable of being modified by receiving instructions from said remote computer.

10. A system for displaying photofinishing goods or services at a plurality of different kiosks, each kiosk having a display device for displaying photofinishing goods or services that are being offered for sale, a data entry device for entering an order dropped at said apparatus, a computer for monitoring what has been entered into said kiosk, comprising;

a central computer in electronic communication with said computer of plurality of said kiosks, said central computer obtaining information regarding orders that have been placed at said kiosks;

wherein said computer of said kiosk comprises a first directory and a second directory, said first directory containing information for controlling the display screens of said display device, said second directory having information for controlling the display screens upon reaching a predetermined criteria.

11. A system according to claim 10 wherein the status of order entered at said kiosks are periodically obtained by said central computer.

12. A system according to claim 11 wherein said predetermined criteria comprises a date.

13. A method for controlling a photofinishing product or service offering at a remote kiosk, comprising the steps of:

providing an initial product offering with respect to a plurality of goods or services on a display screen provided on said kiosk;

said initial product offering being provided in a first presentation sequence;

collection of order information with respect to orders placed at said kiosk; and analyzing said order information and re-sequencing said presentation of said goods or services based on said analysis.

14. A method according to claim 13 further comprising periodically repeating said analysis step.

15. An apparatus for displaying photofinishing goods or services on a display device comprising;

a computer for controlling what is being displayed on said display device;

a software computer program such that when loaded on said computer will control what is being displayed on said display device;

said software segmenting said display device into a plurality of smaller visual segments in which graphical or text information may be provided; and a navigation section for building or rebuilding what is being displayed on said display device by controlling what is displayed in each of plurality of smaller segments responsive to computer software monitoring sales of said photofinishing goods and services.

16. An apparatus according to claim 15 wherein there is provided a pre-staging directory for constructing a display screen that may be substituted for the existing display screen upon reaching a predetermined criteria.

17. An apparatus according to claim 16 wherein said predetermined criteria comprises a date.

18. An apparatus according to claim 17 wherein said pre-staged screen is automatically substituted upon reaching of said criteria.

* * * * *